United States Patent [19]
Redford

[11] Patent Number: 5,295,625
[45] Date of Patent: Mar. 22, 1994

[54] MICROCLIMATE CONTROL APPARATUS

[76] Inventor: Daniel S. Redford, 5270 Elvira Rd., Woodland Hills, Calif. 91364

[21] Appl. No.: 990,293

[22] Filed: Dec. 14, 1992

[51] Int. Cl.⁵ .......................................... A01G 15/00
[52] U.S. Cl. ................................................ 239/14.1
[58] Field of Search .............. 239/2, 14.1; 202/185.3; 203/49

[56] References Cited

U.S. PATENT DOCUMENTS

| | | | |
|---|---|---|---|
| 3,232,846 | 2/1966 | Kinmerle | 202/185.3 |
| 3,748,867 | 7/1973 | Bel Hamri | 239/14.1 X |
| 3,934,756 | 8/1976 | Long | 239/14.1 X |
| 4,404,062 | 9/1983 | Whitehurst | 202/185.3 |

FOREIGN PATENT DOCUMENTS 243539  11/1962  Australia .......................... 239/14.1

Primary Examiner—Andres Kashnikow
Assistant Examiner—Kevin P. Weldon
Attorney, Agent, or Firm—Albert O. Cota

[57] ABSTRACT

A microclimate control apparatus utilizing the water vapor present in the earth's atmosphere as a natural energy source for promoting vertical air movement inside the apparatus, to gather, transport and distribute condensed water. The apparatus is positioned in the air using a proportional suspending system and a balloon enclosure (24) that suspends a tubular sleeve (53) containing water condensation surfaces within, and a hollow, convective lifting column (72) held in the atmosphere by circular ring balloons (106) positioned along the height of the apparatus, its altitude being controlled by a vertical cable (42) wound on a motorized reel (46) attached to the ground. The apparatus' water condenser (54) generates and maintains condensation conditions for the water present in the ascending air stream, promoting convective air movement inside the apparatus.

9 Claims, 8 Drawing Sheets

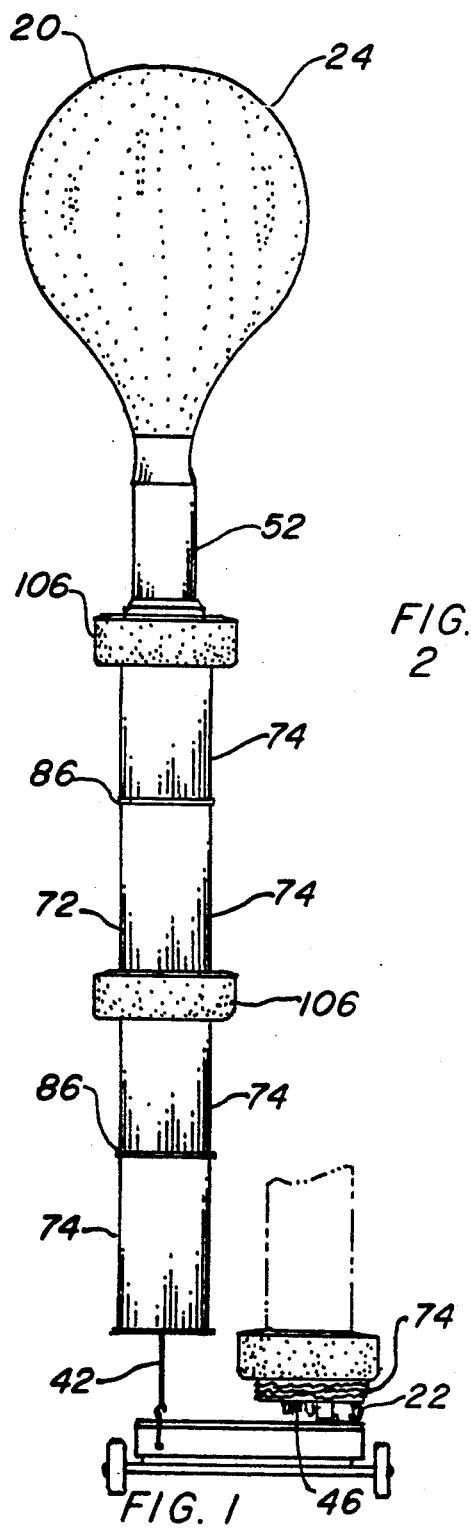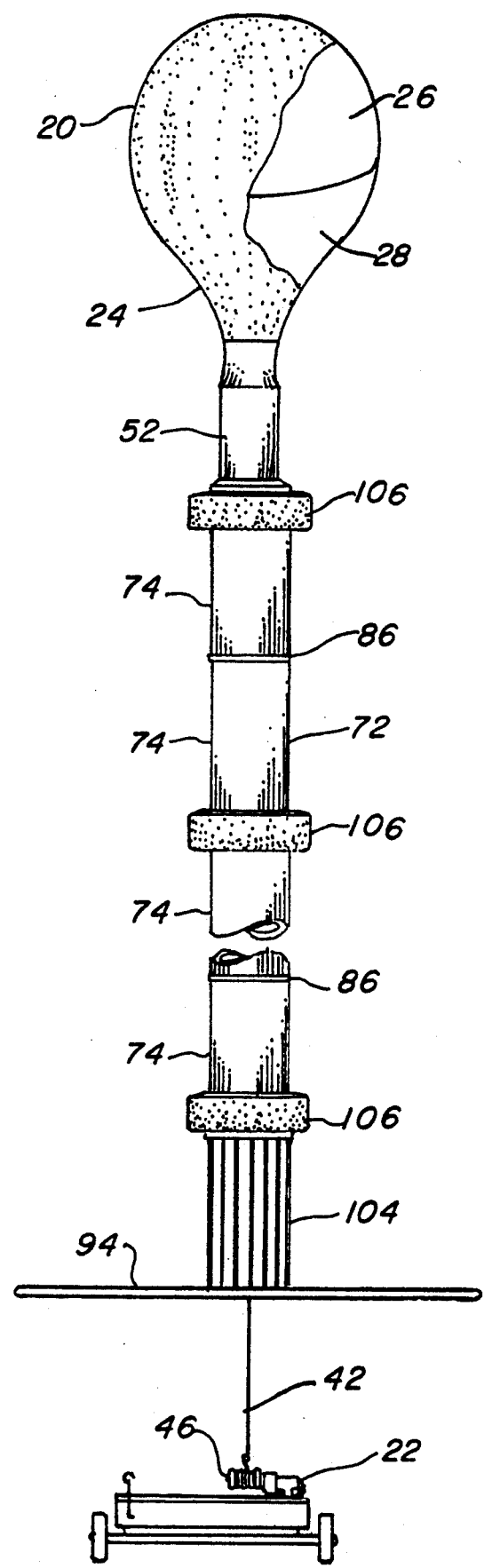

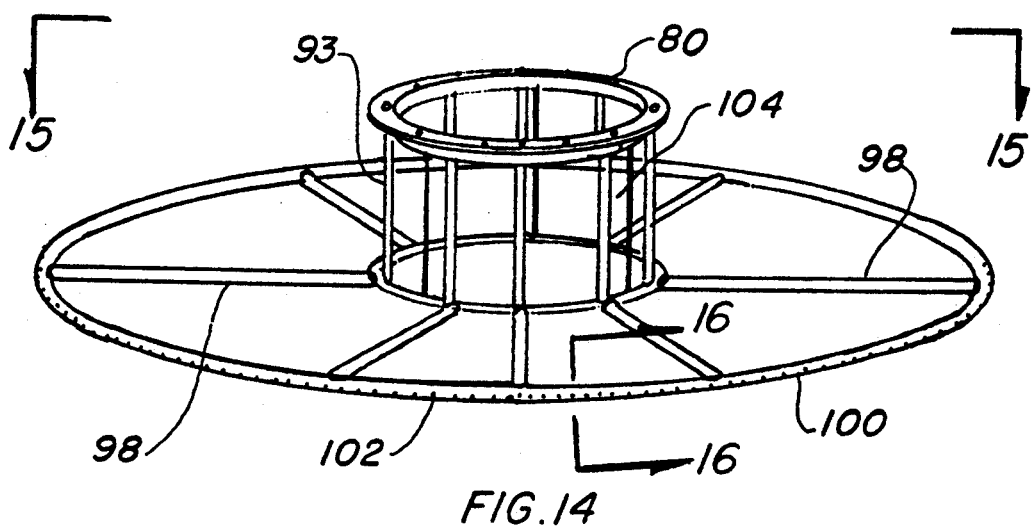
FIG.14
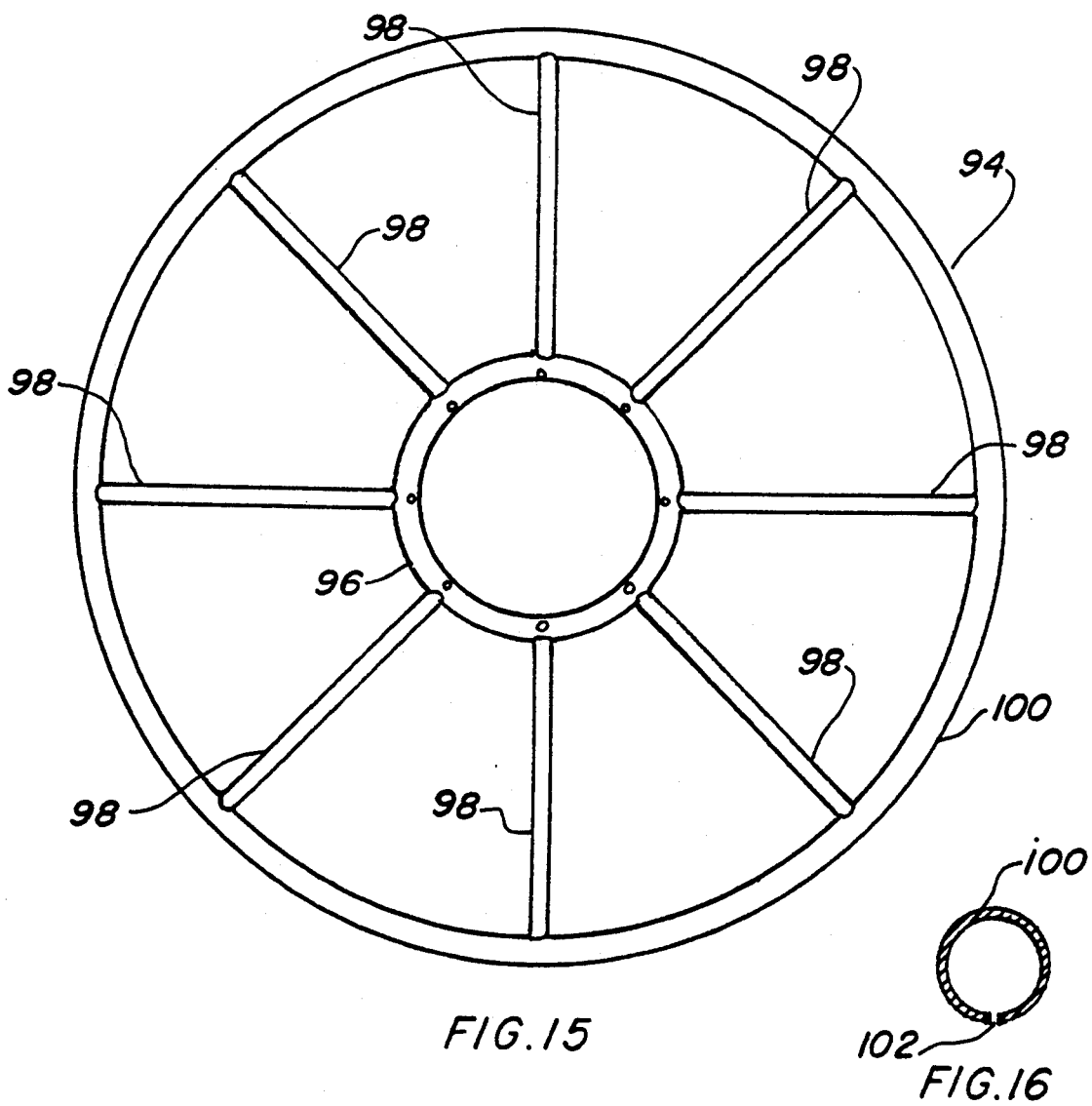
FIG.15
FIG.16

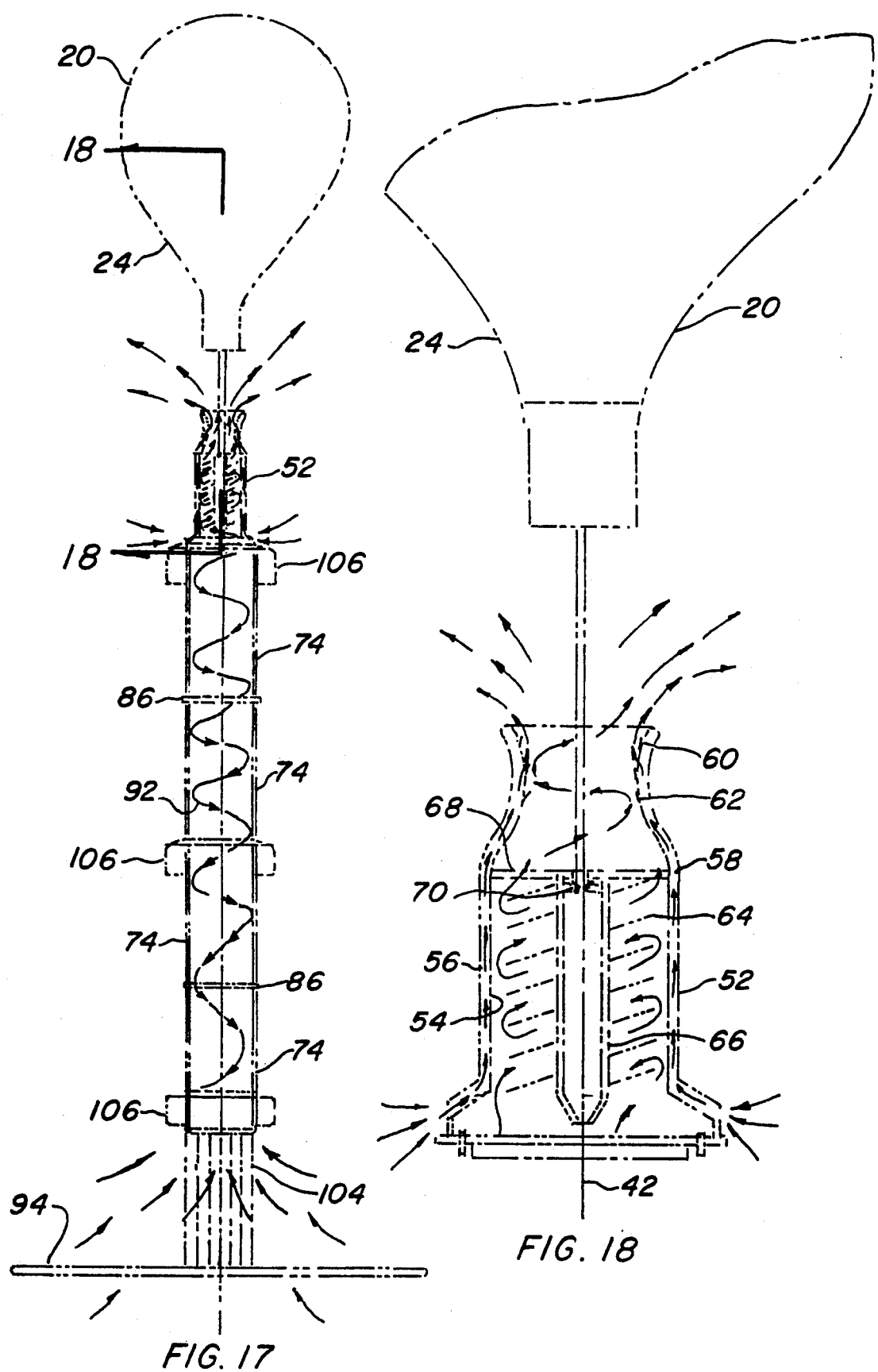

MICROCLIMATE CONTROL APPARATUS

TECHNICAL FIELD

The present invention relates to climate control. More specifically, to an apparatus that generates and maintains atmospheric air convection between layers of air at different temperatures.

BACKGROUND ART

Weather modification may be described as deliberate human intervention to influence and improve the atmospheric processes. Weather modification strategies fall into three subdivisions. The first relies upon the injection of energy by "brute force". The use of powerful heat sources or the intense mechanical mixing of air is exemplified by techniques of fog dispersal. The second subdivision involves alteration of the land and water surface in order to change their natural radiation and heat absorption. The third subdivision involves triggering, intensifying or redirecting the atmosphere's natural energies.

For the last fifty years there have been endless attempts to intensify the atmosphere's natural energies by precipitation enhancement techniques such as cloud seeding, fog dispersal, cloud dispersal, hail suppression and frost prevention, however, these attempts have not produced significant or economical results.

It is object of the present invention to trigger, intensify and redirect the atmosphere's natural energies in order to economically address environmental problems associated with the atmosphere's composition and air temperature, such as smog disbursement, rain distribution, and air temperature control at the ground level.

One of the atmosphere's natural energy utilized in this invention is the solar energy stored in water vapor present in the atmosphere. The water vapor is the most economical and readily available solar energy "accumulators" and "transporters" available on our planet.

There are no accepted methods, to date, which promote air convection in the atmosphere as a way to control the climate of a small geographic area hereafter referred to as "microclimate control".

Climatology studies reveal how the temperature of the atmosphere below the stratosphere zone decreases with the increase in altitude, with the warm air close to the ground level constantly rising until its temperature drops to that of the surrounding air. When this air temperature relationship is changed under special conditions, such as when a cool, stable air mass is trapped below a relatively warmer and also stable air mass, it is known as a so-called "air temperature inversion".

In populated areas affected by this atmospheric condition, the rising air current necessary to mix the polluted air from the lower altitude with the relatively cooler and cleaner air at the higher altitude is suppressed. This will result in the accumulation of a high concentration of smoke which will decrease visibility and endanger the health of the population living in that area. These conditions may last for weeks until they are dispersed by wind or by the temperature change of the respective air masses. To date, no device has effectively and economically been able to solve the smog or fog dispersion problems.

A search of the prior art did not disclose any patents that specifically deal with microclimate control, however, the following U.S. patent is considered related:

| U.S. PAT. NO. | INVENTOR | ISSUED |
|---|---|---|
| 3,974,756 | Long | 17 August 1976 |

Long teaches an apparatus and method for field burning and fog or smog control. In certain agricultural areas, crops that have been harvested and before the next season are normally burned to sterilize the land and decontaminate the area of unwanted seeds and vermin. The normal method is to simply burn the residual vegetation from the field. The smoke containing particulate matter is dispersed at a low altitude, creating a menace to the urban population. Long's invention utilizes a long, segmented, high-altitude flue of flexible lightweight material, suspended vertically by a gas-filled balloon. The flue tapers upwards from an extremely large bottom opening through which the smoke enters. The stack is adjustable in height and is made of fireproof material. A rigid wall enclosure elevated above the ground level and refire grids of refractory materials are used to minimize the escape of combustible materials. Cables connect both the enclosure and balloon, and are held by winch equipped ground vehicles.

DISCLOSURE OF THE INVENTION

The apparatus and function of the present invention are directed to employing a large diameter, tall hollow, vertical column apparatus, suspended in the atmosphere for microclimate control purposes. This apparatus generates and maintains atmospheric air convection movements between layers of air at different temperatures, thereby transporting air through the temperature inversion zones, generating water from the water vapor present in the ambient air, and dispersing the water to the earth's surface as a controlled rain system. The large quantity of caloric energy released naturally into the air inside the apparatus during the water vapor condensation process, creates a large "heat pump" which accelerates the movement of the ascending air inside the apparatus, thus increasing the efficiency of the process.

In its most basic form, the apparatus consists of the following elements:

a suspending means for holding the apparatus in the atmosphere, a water vapor condensation means, attached beneath the suspending means, for creating and maintaining conditions for condensation of water vapor present in the ascending air inside the apparatus, a hollow, cylindrical convective lifting column, attached beneath the water vapor condensation means. The column promotes convective air movement inside the apparatus, while thermally isolating the ascending air therewithin from the outside ambient air, and an altitude control means for regulating the altitude position of the apparatus and determining the optimum position of the apparatus in the atmosphere.

The effect of this apparatus functioning under no wind or light-wind conditions, will create a microclimate change at the earth's surface for an area varying from one-half to several square miles.

The microclimate changes for that limited region will include:

temperature reduction at ground level, controlability of smog and fog.

atmosphere composition control such as decrease in the concentration of carbon dioxide into the atmosphere, and water management control at the ground level.

The theoretical support for the present invention is as follows: water vapor comprises up to 4% of the earth's atmosphere by volume (about 3% by weight) near the surface, but is almost absent above 10 to 12 km. Water vapor is supplied to the atmosphere by evaporation from surface water or by transpiration from plants. The water vapor content of the atmosphere is closely related to air temperature and is therefore greatest in summer and in low latitudes. Much of the re-radiated sun energy by the earth is absorbed by the water-vapor in the atmosphere which constitutes one of the principal energy accumulators and heat transporters on earth.

The water vapor content of the atmosphere is in a constant state of transformation, and is characterized by three important stages: evaporation, condensation and precipitation. Statistical data shows that the atmosphere holds only a very small amount of water, although the exchanges with the land and ocean are considerable. The water vapor content of the atmosphere is indicated by its relative humidity factor, which expresses the actual moisture content of a volume of air, as a percentage of quantity of water vapor contained in the same volume of saturated air at the same temperature.

Condensation, the direct cause of all forms of precipitation occurs when the temperature of the air is reduced, and the volume increased in order to reduce the moisture-holding capacity of the air. This apparatus creates the favorable common circumstances required for the water vapor to begin the condensation process, namely contact cooling offered by a low temperature heat-conductive surface, and the presence of condensation nuclei, such as smog particles or other aerosols present in the air.

In the atmosphere, the actual temperature decreases with height, and if the upward movement of an air parcel continue, the prolong reduction of its temperature and the presence of contact cooling surfaces and condensation nuclei will invariably produce condensation of the water vapors present in that air parcel. As condensation begins, latent heat is released and the initial upward movement of the air parcel is augmented due to decrease in air density. The constant release of latent heat continuously injects fresh supplies of heat energy which accelerate the upward air movement.

In this way, the apparatus acts as a heat pump which extracts heat accumulated in the water vapor in the lower level of the atmosphere close to the earth surface and releases it in the upper part of the apparatus, positioned at high altitude in the atmosphere, and in the process will generate water. At 21 degrees Celsius and 100% relative humidity, 1 kilogram of dry air contains 28 grams of water in vapor form. At 0 degrees Celsius or freezing point, air can hold only 3.8 grams water per kilogram of dry air. The air specific weight at 21 degrees Celsius and below 1,500 meters altitude, is approximately 1.2 kilograms per cubic meter of air.

A kilogram of air at 100% relative humidity entering the apparatus at 21 degrees Celsius, and exiting at high altitude at 0 degrees Celsius will release inside the apparatus $28-3.8=24.2$ grams of water.

An apparatus with a cross section of 30 square meters (approximately 6 meters in diameter) positioned in the atmosphere with its air intake area below 1,500 meters, at 21 degrees Celsius and 100% humidity, which promotes vertical air movement inside with a speed of 1 meter per second, may process up to 100,000 cubic meters of air per hour and generate up to 2.9 metric tons of water per hour. If the vertical air movement inside the apparatus reaches 10 meters per second, the system can process up to 1 million cubic meters of air per hour, and generate over 29 metric tons of water per hour.

Another important component of the earth's atmosphere is the carbon dioxide. The carbon dioxide content of the air averages about 335 parts per million (ppm), and has a significant impact on global temperature by its absorption and re-emission of radiation from the earth. Like water vapor in the atmosphere, the carbon dioxide is also a major accumulator of the re-radiated sun energy by the earth. Carbon dioxide enters the atmosphere mainly by the action of living organisms on land and in the ocean, and by the decay of organic elements in the soil and the burning of fossil fuels. A balance, or dynamic equilibrium is maintained primarily by photosynthesis which removes approximately 3% of the total carbon dioxide annually, and by the assimilation of carbon dioxide by the cold water of the polar seas. In the last 100 years, the total carbon dioxide in the atmosphere is estimated to have increased by 15% due to the burning of fossil fuel.

The present invention creates the conditions necessary for a part of the carbon dioxide, present in the air moving inside of the apparatus, to be mixed and dissolved in the condensed water available in the apparatus' condensation zone.

Theoretical bibliographical background may be found in the following:

ATMOSPHERE, WEATHER and CLIMATE, Fourth edition, Roger G. Barry and Richard J. Chorley, Methuen, London and New York 1982.

The ATMOSPHERE, an Introduction to Meteorology, Second edition, Frederick K. Lutgens and Edward J. Tarbuck, Illinois Central College, PRENTICE-HALL, Inc., 1982, New Jersey, London, Tokyo.

CLIMATOLOGY, An Introduction, John E. Oliver, Indiana State University, John J. Hidore, The University of North Carolina, Charles E. Merrill Publishing, 1984.

It is, therefore, a principal objective of the present invention, to provide a high capacity apparatus for microclimate control, generating and maintaining atmospheric air convection movement through layers of air at different temperatures.

It is an additional objective of the present invention to generate water from the water vapor present in the air, moving inside of the apparatus and to disperse the water to the earth's surface as a controlled rain system for irrigation, drinking, or air cooling purposes.

It is a further objective of the present invention, to control the smog conditions in large populated areas, due to the fact that the apparatus can generate and maintain large holes in the inversion layers below the apparatus' controlled rain system, which will absorb air pollutants from that region into the apparatus for cleaning and dispersing at very high altitudes.

It is a further objective of the present invention, to remove and prevent fog formation in airports and other traffic-sensitive locations, due to the fact that the apparatus can generate and maintain very finely dispersed rain at high altitude, which will cool off the warmer air on top of the fog layer, in order to promote upward air/fog movement, and will create a sufficient condensation center in the fog mass to increase visibility.

It is a further objective of the present invention, to reduce the amount of carbon dioxide in the atmosphere, due to the fact that in the water condensation zone of the apparatus, the carbon dioxide is mixed with water, and offers a tool to control the global warming resulting from the so-called "greenhouse effect".

It is a further objective of the present invention, to reduce the air humidity level in the atmosphere, by positioning the apparatus to extract large quantities of humid air, and to dispense the water closer to the ground into dedicated water containers or into existing bodies of water (lakes, ponds, etc.) for storage or for purchases related to hydro-electric energy.

It is an additional objective of the present invention, to utilize the large quantity of caloric energy naturally released inside of the apparatus during the water vapor condensation process, to create a large "heat pump" which will accelerate the movement of the ascending air inside, and increase the efficiency of the process.

It is a principal advantage of the present invention, that the microclimate changes include temperature reductions at the ground level, due to the fact that the water generated by the apparatus' controlled rain system will evaporate and will absorb heat from the ground and warmer air from above the ground.

A further advantage of the present invention is the apparatus' ability to control water distribution, specifically, the irrigation process at the ground level, without reducing the sunlight exposure for that area as is the case when rain is generated by cloud formations.

Another advantage of the present invention is the apparatus' ability to generate water during the night in order to control the water evaporation at the ground level.

An additional advantage of the present invention is is the apparatus' ability to rotate freely in atmosphere in order to increase its stability due to the gyroscope effect.

A further advantage of the present invention is that due to the high altitude position of the apparatus' air intake area, no adversary wind effect will be created at the ground level.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is an elevation view of the preferred embodiment during assembly, with only a portion of the lifting column assembled, and the column moved to the side to permit the next segment to be assembled.

FIG. 2 is an elevation view of the preferred embodiment in its totally assembled condition, ready to be elevated into the atmosphere.

FIG. 14 is a partial, isometric view of the water distribution system, completely removed from the invention for clarity including the connecting pipe.

FIG. 15 is a view taken along lines 15—15 of FIG. 14.

FIG. 16 is a cross-sectional view taken along lines 16—16 of FIG. 14.

FIG. 17 is an elevation view of the invention, less the cable length control mechanism illustrated in phantom with the direction of airflow shown with arrows.

FIG. 18 is a cross-sectional view taken along lines 18—18 of FIG. 17 illustrating in greater detail the airflow within the tubular sleeve.

BEST MODE FOR CARRYING OUT THE INVENTION

Figure 3:
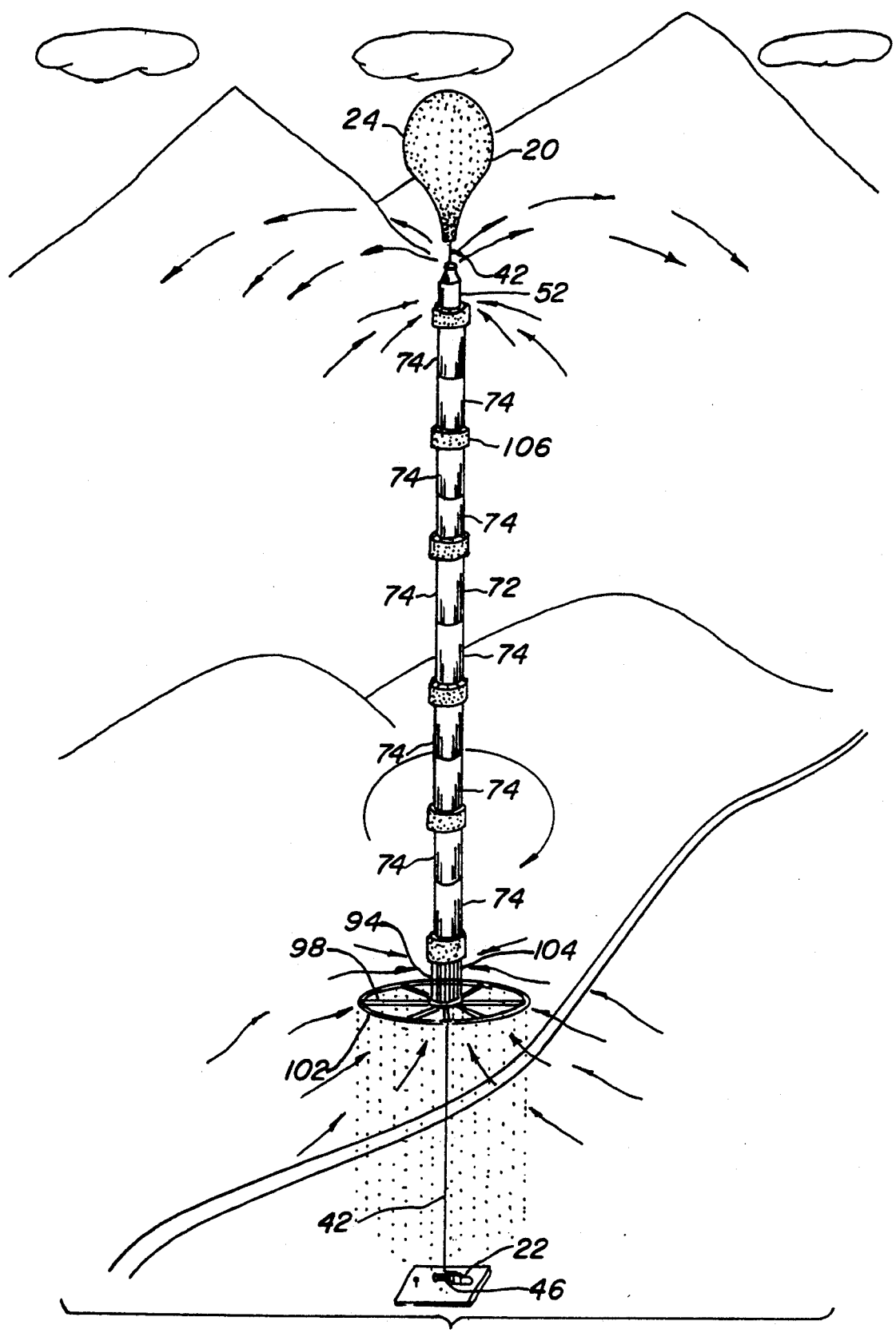
FIG. 3 is an elevation view of the preferred embodiment, elevated at its extended position in the atmosphere with arrows depicting the air flow direction outside the invention.

Features and advantages of the present invention will be enhanced and better understood upon consideration of the following description of the best mode for carrying out the invention in conjunction with the accompanying drawings.

It should be understood by one skilled in the art, that the direction of the flow of air inside the apparatus, and the placement of air passages, as well as the position of the apparatus-suspending-system and apparatus-positioning-system are not restricted to those described.

The preferred embodiment, as shown in FIGS. 1 through 17 is comprised of suspending means 20 for holding the invention in the atmosphere. The suspending means 20 consists of a large balloon enclosure 24, and a proportional suspending system employing circular ring balloons 106 filled with lighter than air gases. The proportional suspending system allows the weight of the apparatus to be proportionally distributed between the circular ring balloons 106 positioned outside the apparatus. The balloon enclosure 24 and the circular ring balloons 106 are shown in FIGS. 1-3 and 17 and are well known in the art for their type of construction and material.

The balloon enclosure 24 has a separated upper area 26 containing lighter than air gas, and a lower area 28 containing elevated temperature air. The ring-balloons 106 contain only lighter than air gas.

Figure 4:
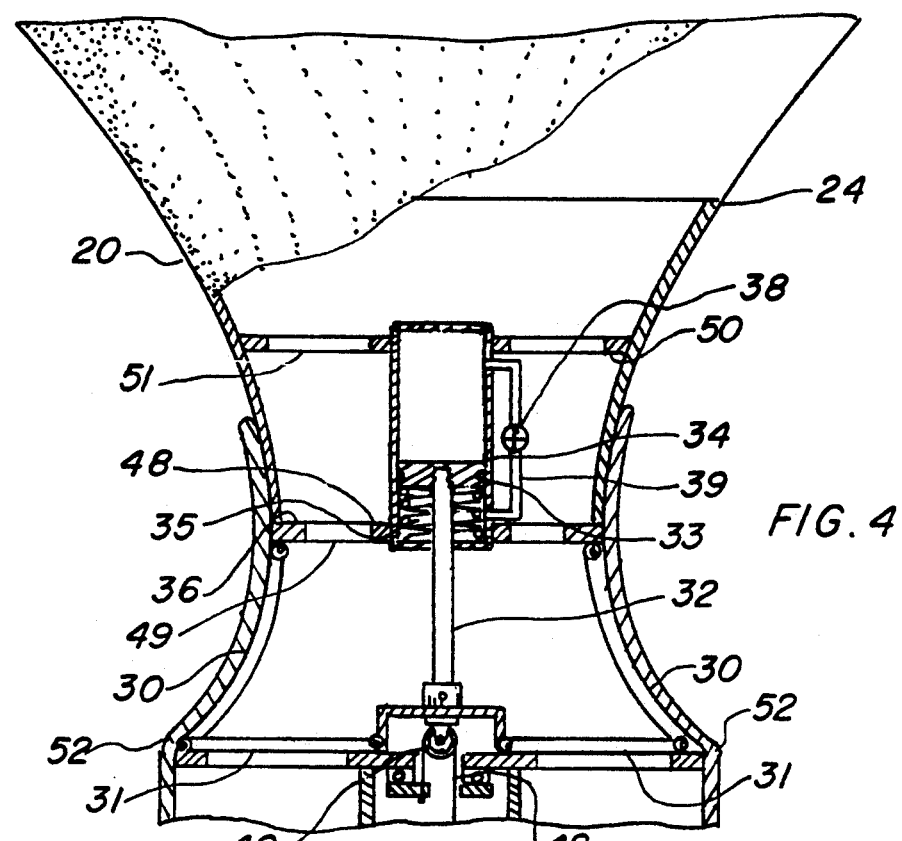
FIG. 4 is a partial, cross-sectional view of the balloon enclosure in its connected (expanded) position, completely removed from the invention for clarity.
Figure 5:
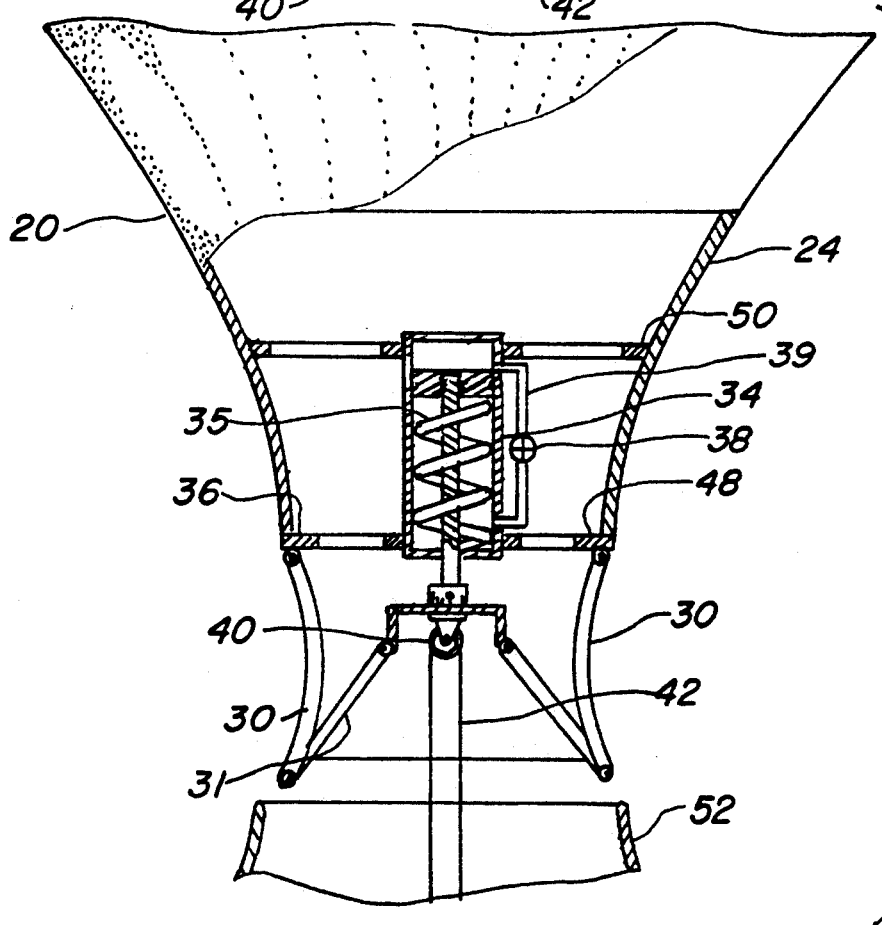
FIG. 5 is a partial cross-sectional view of the balloon enclosure in its released (contracted) position, completely removed from the invention for clarity.

The lower area 28 of the balloon enclosure 24 is provided with a light-weight, rigid structure 36, see FIGS. 4 and 5, which holds the lower area 28 open during the apparatus' operation, allowing elevated temperature air exiting the apparatus to enter the balloon enclosure 24, to add additional buoyancy.

The rigid structure 36 is made in an hourglass-like shape, with the extreme end belled outward. A number of articulating arms 30 and 31 are attached to a piston shaft 32 of a spring-loaded hydraulic cylinder 34 on one end, and to the rigid structure 36 on the other end. Two annular rings 48 and 50 rigidly attach the cylinder 34 to the rigid structure 36.

The hydraulic cylinder 34 contains a piston 33 provided with a shaft 32 forced downward away from the cylinder against a spring 35 pressure and spreads the articulated arms 30 outward to conform to the shape of an adjacent section defined by a water vapor condensation means 52. A remote-controlled on/off valve 38 positioned in-line in a hydraulic circuit 39, which connects the upper and the lower area of the cylinder 34, controls the position of the piston 33, shaft 32 and articulated arms 30 and 31, in relation to the cylinder 34. A pulley 40 is also attached to the end of the shaft 32 as depicted in FIGS. 4 and 5.

Figure 6:
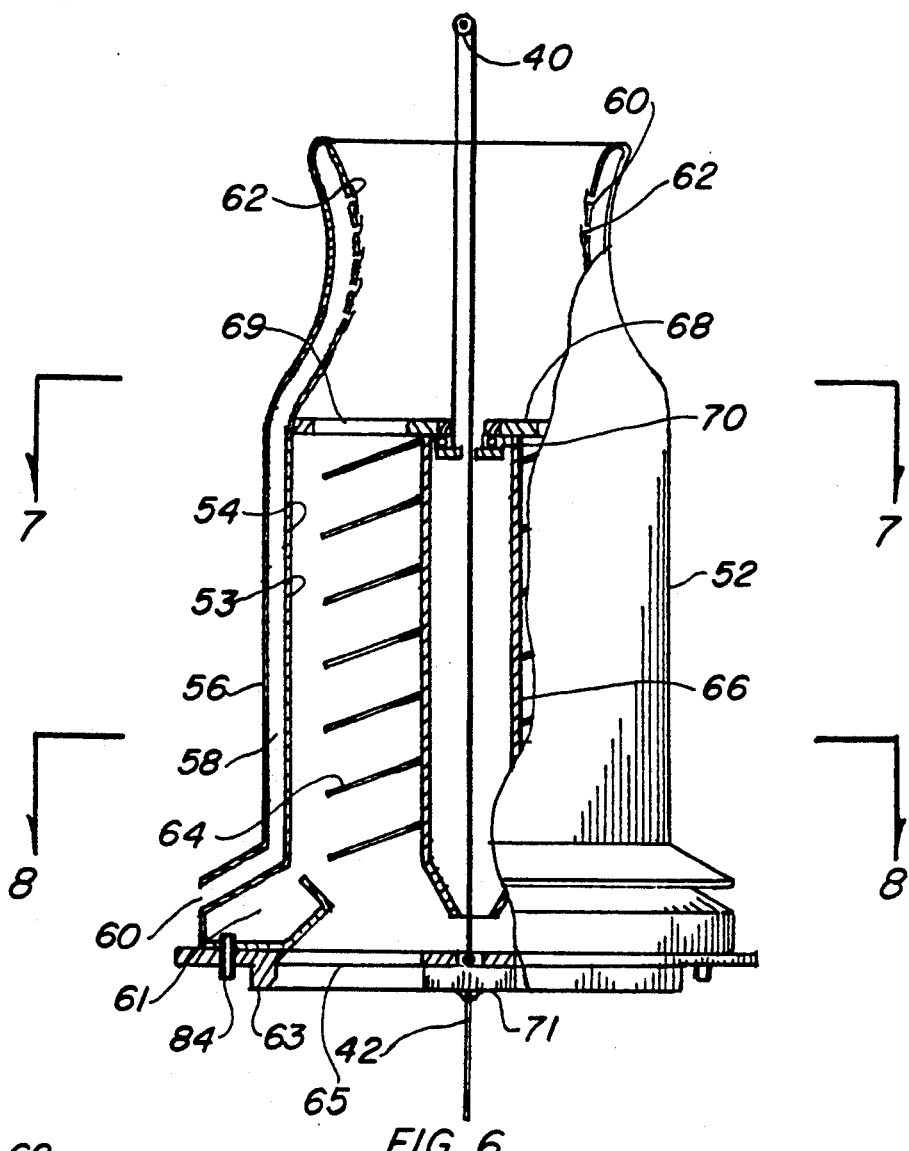
FIG. 6 is a cross-sectional view of the water condensation means, completely removed from the invention for clarity.
Figure 7:
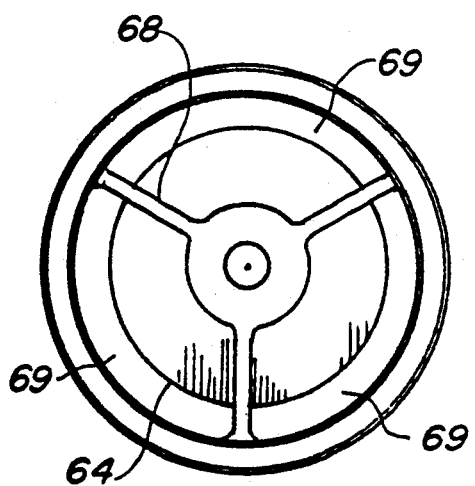
FIG. 7 is a cross-sectional view taken along lines 7—7 of FIG. 6.
Figure 8:
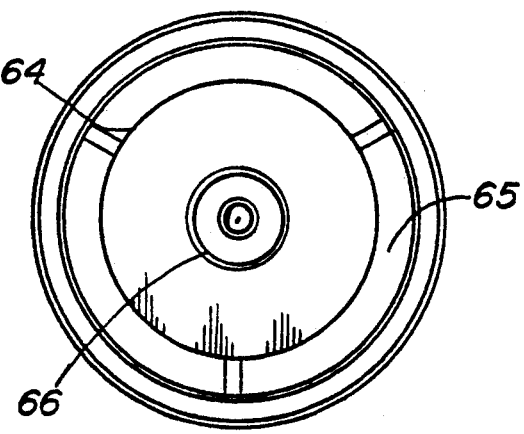
FIG. 8 is a cross-sectional view taken along lines 8—8 of FIG. 6.

The suspending means has enough lifting ability to carry the weight of the apparatus into the atmosphere, and is held in place and constrained by altitude control means 22. The control means 22 regulates the altitude position of the apparatus and determines the optimum position in the atmosphere. The means 22 consists of a vertical cable 42 having a first end looped through a pulley 40 as illustrated in FIGS. 4, 5 and 6, and then permanently attached to a water vapor condensation means 52 directly below the balloon enclosure 24 (see FIG. 6). The second end of the cable 42 is wound around a cable length control mechanism in the form of a motorized reel 46 that is rigidly attached to a stationary (not shown) or moving platform on the ground surface as depicted in FIGS. 1 and 2. In order to assemble and disassemble the apparatus on the ground, the cable 42 is segmented, permitting detachment as illustrated in FIG. 1, allowing an individual section to be placed over the reel 46 during assembly with the attached sections moved to the side, such that the cable 42 may be connected to both the first and second ends, and be positioned in the center of the apparatus when assembled. The motorized reel 46 contains a brake and has sufficient torque to hold the balloon 24 and to wind the cable 42 around the reel.

It should be noted that the annular rings 48 and 50 are formed with open sections 49 and 51 respectively between the periphery and attachment to the cylinder 34, permitting elevated temperature air to enter the hgwer area 28 of the balloon enclosure 24 through the openings as illustrated in FIG. 6. The water vapor condensation means 52 is attached beneath the suspending means creating and maintaining the conditions for condensing water from the air ascending inside the apparatus. This water vapor condensation means 52 consists basically of a hollow double walled tubular sleeve 53. This sleeve 53 has an internal tubular heat-conductive water condenser 54 and a external tubular wall 56 with an open space 58 therebetween. An opening 60 is formed in the lower portion of the external tubular wall 56 through which cool atmospheric air may enter.

The upper portion of a condenser 54 is shaped radially inward in a venturi-shape tube, and is provided with at least one one-way valve 62. As illustrated in FIGS. 1 and 2, the balloon enclosure 24 is removably attached to the water vapor condensation means 52 in an airtight manner until the apparatus has reached a desired altitude and is ready for functional separation. During the apparatus' operation, the air travelling inside the apparatus through the venturi-shaped area will open the one-way valves 62, and allow the colder atmospheric air present in the space 58, which is formed between the condenser and the external wall, to enter inside the apparatus. This cold air circulation inside the space 58 will cool the heat-conductive condenser 54 during the apparatus' operation.

For increased efficiency, the double-walled tubular sleeve 53, consists of a spiral-shaped blade 64, attached to a hollow tube structure 66. This spiral-shaped blade 64 forces the air moving upwards inside the apparatus to swirl in a cyclonic-like motion, increasing air contact with the cold surface of the condenser 54, in order to optimize water condensation.

The hollow tube structure 66 is affixed to the condenser 54 with an annular ring 68, provided with open sections 69 between the periphery and the hollow tube structure 66, permitting the air to pass through.

The blade 64 does not touch the condenser 54, thus leaving space for the condensate to move freely down the inside surface of the condenser 54, into a hollow, annular water collector 61 positioned beneath the condenser 54. The water collector 61 collects the water coming down on the condenser 54, and transfers the collected water to the balance of the apparatus for transport and distribution.

The water condensation means 52 is supported by a structure-support-annular-ring 63 attached beneath the water collector 61. Open sections 65 and 69 are present on the annular rings 63 and 68 permitting the air to pass through.

Bearings 70 and 71 are attached to a cable 42 and permits water condensation means 52 to rotate freely around the cable 42 during the operation.

By allowing the apparatus to rotate freely around the cable 42, the present invention uses the gyroscope effect to stabilize the entire apparatus in the air and to avoid non-uniform exposure to the sun.

Figure 9:
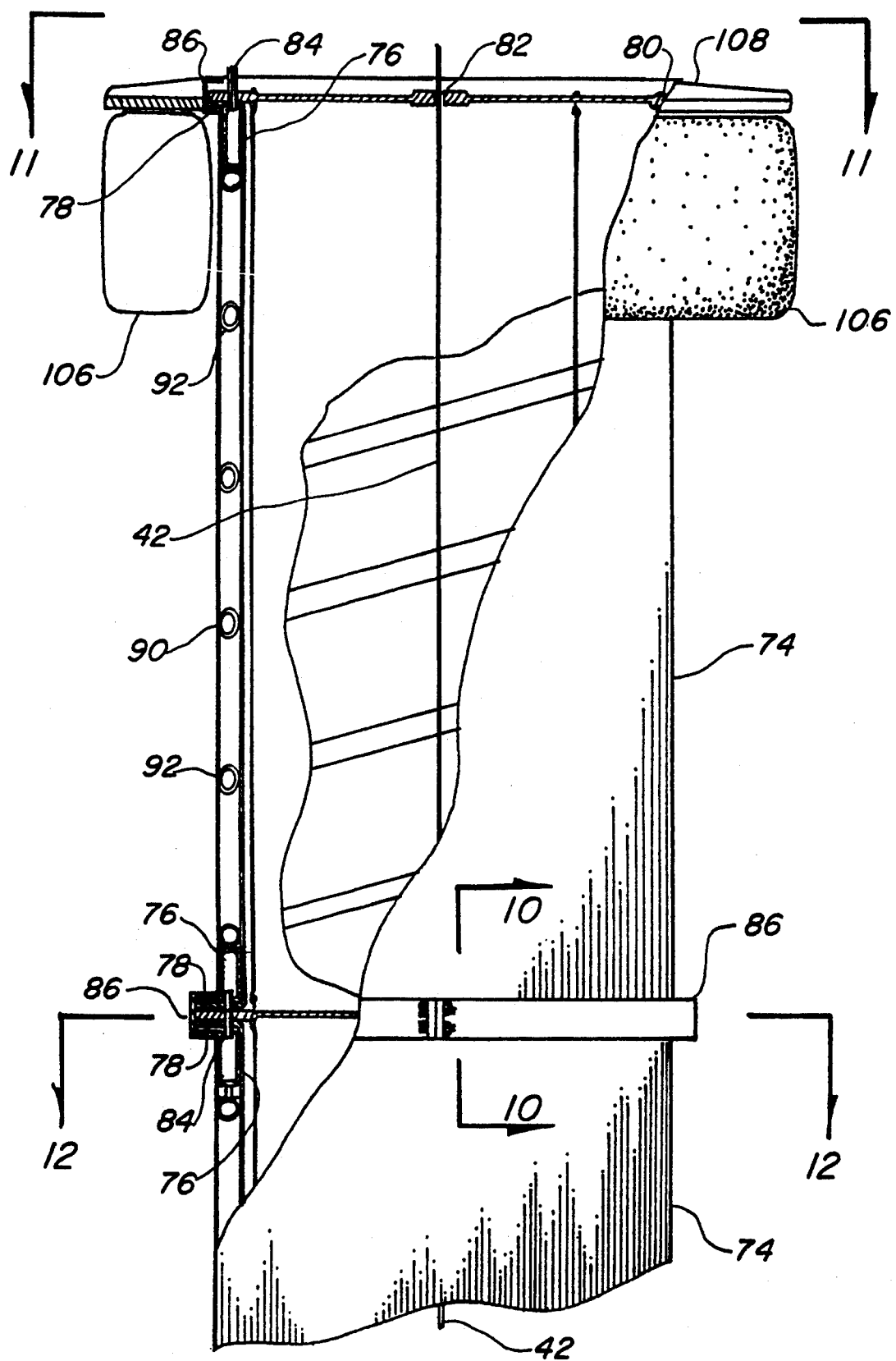
FIG. 9 is a fragmentary, elevation view of the partially cutaway, double-walled tubular structure of the lifting column.
Figures 10, 11:
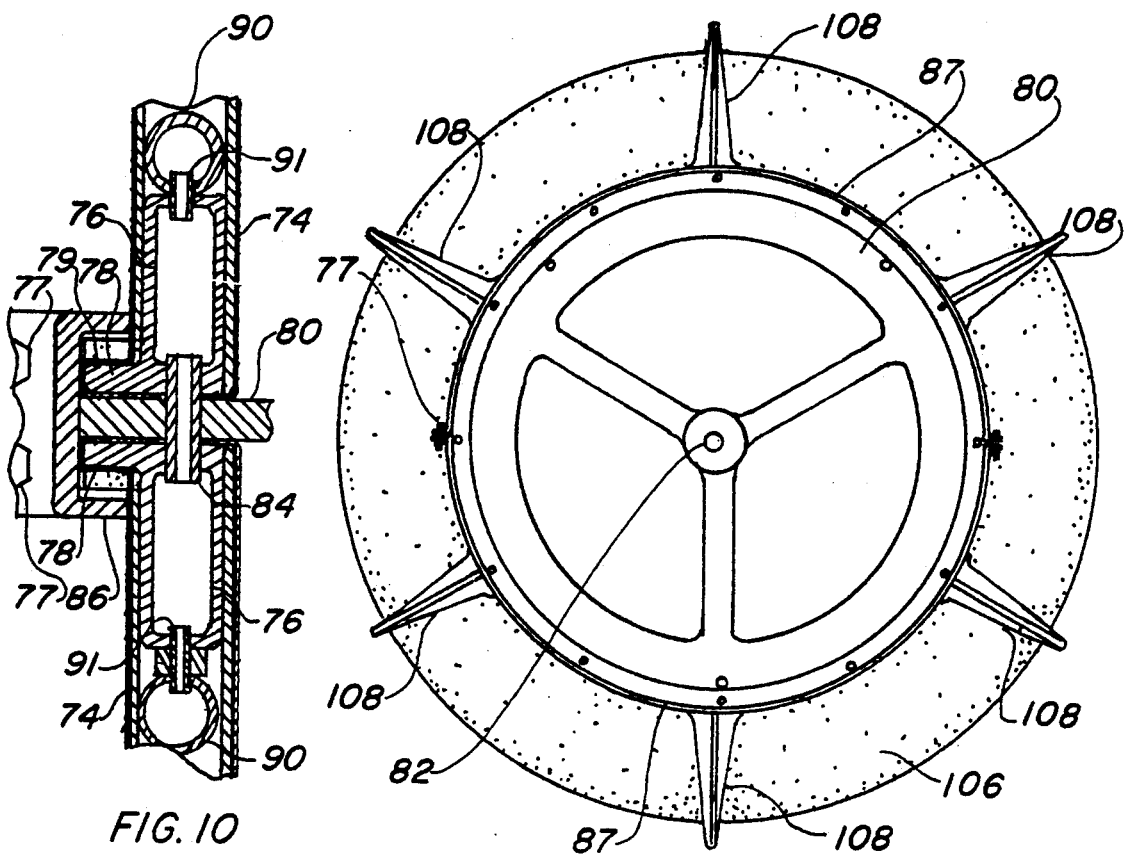
FIG. 10 is a cross-sectional view taken along lines 10—10 of FIG. 9.
FIG. 11 is a cross-sectional view taken along lines 11—11 of FIG. 9.

A hollow, cylindrical, convective lifting column 72 is attached beneath the water vapor condensation means 52 and consists of a plurality of column segments 74 attached to each other in an airtight manner, as illustrated in FIGS. 9 and 10. Furthermore, an air intake area 104 on a lower portion of the column 72 as shown in FIGS. 2, 3 and 17 allow air to enter therein, inside the column. Also, water transportation means 92 shown in FIG. 9, and water distribution means 94, shown in FIGS. 14 and 15 for conveying and dispensing water from the water vapor condensation means 52 to a ground surface beneath the apparatus. At any rate, two of the separate column segments 74 and a double-walled expandable flexible structure formed of a light-weight, pliable material, are illustrated attached together in a cut away view of FIG. 9.

Each segment 74 has two hollow, water collecting, annular sections 76, as illustrated in FIGS. 9 and 10, integral with the top and bottom. Each annular section 76 is positioned inside the double-walled structure of the column segment 74, and is used to transfer the condensed water between two column segments 74. The section 76 is made of rigid, light weight, plastic material and has an outwardly depending flange 78, which contiguously embraces a rigid annular ring 80 as shown in cross section in FIGS. 9 and 10 and by itself cut away in FIG. 13. This ring 80 also has open sections 81 for air movement and a hole 82 in the middle. A number of hollow connecting tubes 84 are inserted between the flanges 78 and the ring 80 creating a passageway for the water to flow between two segments 74.

As shown in FIG. 10, a clamping girdle 86 encompasses and holds together the ring 80, two circular gaskets 79, and the two flanges 78, this girdle 86 seals air-tight the segments 74, and is fabricated in two or more sections which are fastened together using a plurality of screws 77.

Figures 12, 13:
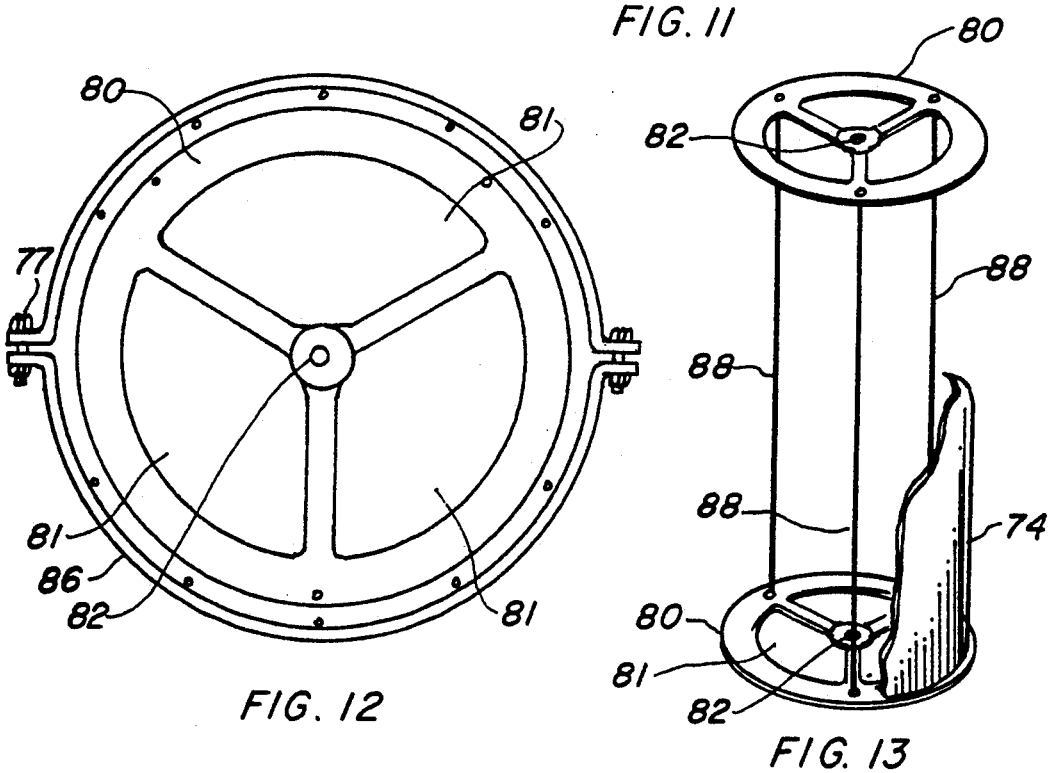
FIG. 12 is a a cross-sectional view taken along lines 12—12 of FIG. 9.
FIG. 13 is a partial, isometric view, of the expandable flexible structure of a section of the lifting column, with the outside and inside walls partially cut away to expose the internal suspending structure.

A number of support wires 88 are connected between the annular rings 80, as illustrated in FIG. 13, and unitedly form a restraining structure to space the rings 80 apart a given distance and become the weight bearing reinforcement for the double walls of the sections 74, particularly in the flexible structure formed of light weight pliable material.

The water transportation means 92 which consists of a spiral piping system that is hydraulically connected to the water vapor condensation means 52. The piping system is positioned inside the convective lifting column 72 and functions to transport the condensed water downward therethrough. This piping system also provides structural support for the column 72. The piping system is formed of a light weight hollow pipe 92, that is connected by a plurality of tubes 91 to the hollow annular sections 76, providing a water passageway through the entire length of the column 72.

The weight of the water travelling down the spiral piping system will cause the entire column 72 to rotate around the cable 42. This rotation is generated by the spiral configuration of the piping system, and increase the apparatus stability in the atmosphere—the gyroscope effect.

The water distribution means 94 consists of a circular piping system that is suspended below the intake area of the convective lifting column 72. The circular piping system is hydraulically connected to the water transportation means from where the condensed water is dispersed to the earth's surface below. This circular piping system having a plurality of vertical tubes 93 positioned in front of the apparatus' intake area 104, connects the annular ring 80 of the last water-collecting section 76 of the column 72 to an inside hollow circular ring 96. As shown in FIGS. 14 and 15, the hollow circular ring 96 is connected to an outside hollow circular ring 100, by a number of radially extending horizontal tubes 98.

A series of nozzle openings 102 are located around the periphery of the outside ring 100 as shown in FIG. 16 and as the entire water distribution means 94 is hollow, it is hydraulically connected inside. The water distribution means 94 therefore receives the water condensed from the air in the water condensation means 52 and disperses into the air through the nozzle openings 102 in a circular pattern.

The entire lifting column 72 is held in place in the atmosphere by both the balloon enclosure 24 and by a series of circular ring balloon enclosures 106 that are positioned along the length of the lifting column 72 preferably on alternate segments 74. As illustrated in FIG. 11, the ring balloon enclosures 106 are held in place by a number of outwardly extending fingers 108 integral with a peripheral clamp 87 that seals the segments 74 together. The girdle 86 is used between alternate rings and is configurated without the fingers 108 as shown in FIG. 10. Further, the clamp 87 and girdle 86 are segmented, at least in two parts to permit assembly in sections.

The invention is assembled in sections on the ground over the motorized reel 46 with the balloon enclosure 24 slipped inside the tubular sleeve 53 and the articulating arms 30 are deployed by hydraulic cylinder 34. The arms 30 expand against the internal wall 54 of the sleeve 53 holding it tightly in place as shown in FIG. 4.

The vertical cable 42 is threaded through the pulley 40 and looped downward and attached on the end to the bearing 70 that is mounted on the annular ring 68, and the cable is then positioned in the center of the sleeve and thus through the structure support annular ring 63.

The balloon 24 pulls the sleeve 53 into the air and the cable 42 is disconnected and brought over to one side, as shown in FIG. 1, where the first segment 74 of the lifting column is then placed over the reel 46. The balloon and sleeve 24 and 52 are then returned to their original position over the reel 46 and attached to the segment 74 with the peripheral clamp 87. Succeeding segments are assembled in like manner with alternate segments having circular ring balloon enclosures 106. Finally, the water distribution 94 is attached to the last segment 74. The entire apparatus in then permitted to rise to the desired height as shown in FIG. 3, and the on/off valve 38 is energized by remote radio control, disengaging the arms 30. The reel 46 is unreeled faster than the ascension of the apparatus, leaving a predetermined distance between the balloon 24 and the sleeve 53 for air to flow as depicted in FIGS. 3 and 17.

In operation, the lifting column 72 attached beneath the water vapor condensing means 52 promotes convective air movement inside the column while thermally isolating ascending air from the outside ambient air. The invention therefore generates and maintains atmospheric air convection movement inside the apparatus, in conjunction with condensing the water vapor present in the air and distributing the water on the ground below.

The apparatus functions as follows: water vapor in the atmosphere is part of the air's gaseous mix and the upper limit of the quantity of vapor possible to be held in the atmosphere varies with the air temperature, thus, warm air can hold more water vapor than the cold air. For example, at 21 degrees Celsius, air can hold 28 gr. of water per kg of dry air. At 0 degrees Celsius or freezing point, air can hold only 3.8 gr. water per kg of dry air.

Condensation occurs when the air carrying water vapor cools by conduction when moving on a cold surface and reaches the vapor saturation point or dew-point.

As condensation begins on the cold internal condenser walls 54, latent heat is released (580 cal/gr. of water) and the initial upward movement of the air inside the apparatus is augmented by an expansion and a decrease in air density.

At this stage, upward movements of air may easily reach a speed which may be in exceeds of 30 m/sec., and the constant release of latent heat continuously injects fresh supplies of heat energy. The upper portion of the condenser wall 54 is shaped radially inwardly in a venturi-shaped tube, and is provided with a number of one-way valves 62. During the apparatus' operation, the air travelling inside the apparatus through the venturi-shaped area will open the one-way valves 62, and will allow the colder atmospheric air present in the space 58 to enter inside the apparatus. This cold air circulation inside the space 58 will cool the heat-conductive condenser wall 54 during the apparatus' operation. The water condensation process is enhanced by a spiral-shaped blade 64, which forces the air moving upwards inside the apparatus to swirl in a cyclonic-like motion, increasing air contact with the cold surface of the condenser wall 54.

Water condensed from the air moving inside the apparatus is received and collected from the surface of the condenser wall 54 and is gravitationally transported by a spiral piping system through the convective lifting column 72 to the water distribution means 94.

The convective lifting column 72 is the longest component of the apparatus. It may reach several thousand feet in length and may be built totally or partially of axially collapsible sections. For the purpose of transporting and assembling, the apparatus is built one section at a time and then attached together on the ground.

A piping system resembling a spiral spring is positioned inside the double-walled convective lifting column 72, to transport the water from the top to the bottom, and provides structural support. This piping system is formed of a light weight hollow pipe 90 that is connected by a plurality of tubes 91 to the hollow annular sections 76, providing a water passageway through the entire length of the column 72.

During the apparatus operation, the weight of the water travelling down the piping system will cause the entire column 72 to rotate around the cable 42. This rotation is generated by the spiral configuration of the piping system, and increase the apparatus stability in the atmosphere due to the gyroscope effect.

The weight of the apparatus is supported by a central balloon enclosure 24, in combination with a proportional suspending system employing circular ring balloons 106 filled with lighter than air gases. The proportional suspending system allows the weight of the apparatus to be compensated by balloons positioned outside the apparatus. Each balloon of the proportional suspending system has to support 100% of the weight of one or two double-walled sections 74 positioned underneath, its own weight, and must also support the weight of the water present in the piping system inside those sections.

For example, a circular ring balloon filled with helium and having a diameter of the interior ring equalling 6 meters, a diameter of its exterior ring equalling 10 meters, and a height of 6 meters, positioned in the air, below 1,500 meters, may support a load up to 230 kilograms, including its own weight. Considering that this apparatus produces 2,900 kilograms of water per hour or 0.8 kilograms of water per second, such weight is relatively light. If the length of the apparatus is 1,000 meters, and is divided into 24 modular segments, and the water speed moving down the spiral piping system is at 10 meters per second, then at any moment the apparatus will contain the water produced in the last 1,000/10=100 seconds, or 80 kilograms. This weight will be distributed between 12 circular ring balloons (one balloon per two sections).

A main balloon enclosure having a diameter of 20 meters and if filled with helium may support up to 1,800 kilograms including its own weight. The principal task for the main balloon enclosure is to keep the apparatus in the air in a vertical position in order to permit its rotation around the positioning cable.

While the preferred embodiment is shown and described herein, another structure of size and shape may be substituted with equal ease, provided the same basic elements to place and maintain the column in the atmosphere are used, and the condensing surface is cooled sufficiently to cause condensation, and a method to transport the water to the ground below is accomplished.

Furthermore, while the invention has been described in complete detail and pictorially shown in the accompanying drawings, it is not be limited to such details, since many changes and modifications may be made to the invention without departing from the spirit and scope thereof. Hence, it is described to cover any and all modifications and forms which may come within the language and scope of the appended claims.

I claim:

1. A microclimate control apparatus utilizing the water vapor present in the earth's atmosphere as a neutral energy source for promoting ascending air movement inside the apparatus, to gather, transport and distribute condensed water, as a way to control the climate of a geographic area, the apparatus comprising:
   a) a suspending means for holding the apparatus in the atmosphere.
   b) a water vapor condensation means, for creating and maintaining conditions for condensation of water vapor present in the ascending air inside said apparatus,
   c) a hollow, cylindrical convective lifting column, attached beneath said water vapor condensation means, promoting convective air movement inside said apparatus, while thermally isolating the ascending air therewithin from the outside ambient air, and
   d) an altitude control means for controlling the position of the apparatus in the atmosphere.

2. A microclimate control apparatus utilizing the water vapor present in the earth's atmosphere as a natural energy source for promoting ascending air movement inside the apparatus, to gather, transport and distribute condensed water, as a way to control the climate of a geographic area, the apparatus comprising:
   a) a suspending means for holding the apparatus in the atmosphere, wherein said suspending means further comprises a balloon enclosure having a separated upper area and a lower area, the upper area containing lighter than air gas, and the lower area containing elevated temperature air for additional buoyancy, and a proportional suspending system which allows the weight of the apparatus to be proportionally distributed between a plurality of circular ring balloons containing lighter than air gases, positioned along the length of said apparatus,
   b) a water vapor condensation means, for creating and maintaining conditions for condensation of water vapor present in the ascending air inside said apparatus, and,
   c) a hollow cylindrical convective lifting column, attached beneath said water vapor condensation means, promoting convective air movement inside said apparatus, while thermally isolating the ascending air therewithin from the outside ambient air, and,
   d) an altitude control means for controlling the position of the apparatus in the atmosphere.

3. A microclimate control apparatus utilizing the water vapor present in the earth's atmosphere as a natural energy source for promoting ascending air movement inside the apparatus, to gather, transport and distribute condensed water, as a way to control the climate of a geographic area, the apparatus comprising:

a) a suspending means for holding the apparatus in the atmosphere, b) a water vapor condensation means, for creating and maintaining conditions for condensation of water vapor present in the ascending air inside said apparatus.

c) a hollow, cylindrical convective lifting column, attached beneath said water vapor condensation means, promoting convective air movement inside said apparatus, while thermally isolating the ascending air therewithin from the outside ambient air, and d) an altitude control means for controlling the position of the apparatus in the atmosphere, said altitude control means comprising a vertical cable centrally positioned inside said apparatus, permitting the apparatus to rotate and stabilize its position in atmospheric operation, said vertical cable further having a first end and a second end with the first end attached to said suspension means, also having a cable length control mechanism positioned beneath said apparatus on a ground surface with the second end of the cable windably disposed thereon.

4. A microclimate control apparatus utilizing the water vapor present in the earth's atmosphere as a natural energy source for promoting ascending air movement inside the apparatus, to gather, transport and distribute condensed water, as a way to control the climate of a geographic area, the apparatus comprising:

a) a suspending means for holding the apparatus in the atmosphere, wherein said suspending means further comprises a balloon enclosure having a separated upper area and a lower area, the upper area containing lighter than air gas, and the lower area containing elevated temperature air for additional buoyancy, and a proportional suspending system which allows the weight of the apparatus to be proportionally distributed between a plurality of circular ring balloons containing lighter than air gases, positioned along the length of said apparatus, said balloon enclosure is removably attached to said water condensation means in an airtight manner, until said apparatus has reached a desired altitude and is ready for functional separation, b) a water vapor condensation means, for creating and maintaining conditions for condensation of water vapor present in the ascending air inside said apparatus, c) a hollow, cylindrical convective lifting column, attached beneath said water vapor condensation means, promoting convective air movement inside said apparatus, while thermally isolating the ascending air, therewithin from the outside ambient air, and d) an altitude control means for controlling the position of the apparatus in the atmosphere.

5. A microclimate control apparatus utilizing the water vapor present in the earth's atmosphere as a natural energy source for promoting ascending air movement inside the apparatus, to gather, transport and distribute condensed water, as a way to control the climate of a geographic area, the apparatus comprising:

a) a suspending means for holding the apparatus in the atmosphere, b) a water vapor condensation means, for creating and maintaining conditions for condensation of water vapor present in the ascending air inside said apparatus, said water vapor condensation means further comprises a hollow double-walled tubular sleeve having an internal heat-conductive tubular water condenser and an external tubular wall having an opening in a lower portion permitting cold atmospheric air to enter between the condenser and the external wall and circulate upwards for cooling said water condenser, wherein the double-walled sleeve further has at least one one-way valve disposed on an upper portion permitting this cold atmospheric air to enter said apparatus, and c) a hollow, cylindrical convective lifting column, attached beneath said water vapor condensation means, promoting convective air movement inside said apparatus, while thermally isolating the ascending air therewithin from the outside ambient air, and, d) an altitude control means for controlling the position of the apparatus in the atmosphere.

6. A microclimate control apparatus utilizing the water vapor present in the earth's atmosphere as a natural energy source for promoting ascending air movement inside the apparatus, to gather, transport and distribute condensed water, as a way to control the climate of a geographic area, the apparatus comprising:

a) a suspending means for holding the apparatus in the atmosphere, b) a water vapor condensation means, for creating and maintaining conditions for condensation of water vapor present in the ascending air inside said apparatus, said water vapor condensation means further comprises a hollow double-walled tubular sleeve having an internal heat-conductive tubular water condenser and an external tubular wall having an opening in a lower portion permitting cold atmospheric air to enter between the condenser and the external wall and circulate upwards for cooling said water condenser, said double walled tubular sleeve has a hollow, annular water collector positioned beneath said water condenser, further said sleeve having a spiral shaped blade positioned inside, causing ascending air to swirl in a cyclonic-like motion, increasing air contact with said water condenser to optimize water condensation, wherein the double-walled sleeve further has at least one one-way valve disposed on an upper portion permitting this cold atmospheric air to enter said apparatus, and c) a hollow, cylindrical convective lifting column, attached beneath said water vapor condensation means, promoting convective air movement inside said apparatus, while thermally isolating the ascending air therewithin from the outside ambient air, and, d) an altitude control means for controlling the position of the apparatus in the atmosphere.

7. A microclimate control apparatus utilizing the water vapor present in the earth's atmosphere as a natural energy source for promoting ascending air movement inside the apparatus, to gather, transport and distribute condensed water, as a way to control the climate of a geographic area, the apparatus comprising:

a) a suspending means for holding the apparatus in the atmosphere, b) a water vapor condensation means, for creating and maintaining conditions for condensation of water vapor present in the ascending air inside said apparatus, and c) a hollow, cylindrical convective lifting column, attached beneath said water vapor condensation means, promotong convective air movement inside said apparatus, while thermally isolating the ascending air therewithin from the outside ambient air, said lifting column further comprises, a plurality of column segments that are attached to each other in an airtight manner, an air intake area on a lower portion of the convective lifting column allowing air to enter therein also water transportation means and water distribution means, for conveying and dispensing water from said water vapor condensation means to a group surface beneath the apparatus, and d) an altitude control means for controlling the position of the apparatus in the atmosphere.

8. A microclimate control apparatus utilizing the water vapor present in the earth's atmosphere as a natural energy source for promoting ascending air movement inside the apparatus, to gather, transport and distribute condensed water, as a way to control the climate of a geographic area, the apparatus comprising:

a) a suspending means for holding the apparatus in the atmosphere, b) a water vapor condensation means, for creating and maintaining conditions for condensation of water vapor present in the ascending air inside said apparatus, c) a hollow, cylindrical convective lifting column, attached beneath said water vapor condensation means, promoting convective air movement inside said apparatus, while thermally isolating the ascending air therewithin from the outside ambient air, said lifting column further comprises, a plurality of column segments that are attached to each other in an airtight manner, an air intake area on a lower portion of the convective lifting column allowing air to enter therein also water transportation means and water distribution means, for conveying and dispensing water from said water vapor condensation means to a ground surface beneath the apparatus, said water transportation means further comprises, a spiral piping system hydraulically connected to the water vapor condensation means, said piping system positioned inside the convective lifting column, for transporting condensed water downward therethrough and d) an altitude control means for controlling the position of the apparatus in the atmosphere.

9. A microclimate control apparatus utilizing the water vapor present in the earth's atmosphere as a natural energy source for promoting ascending air movement inside the apparatus, to gather, transport and distribute condensed water, as a way to control the climate of a geographic area, the apparatus comprising:

a) a suspending means for holding the apparatus in the atmosphere, b) a water vapor condensation means, for creating and maintaining conditions for condensation of water vapor present in the ascending air inside said apparatus, c) a hollow, cylindrical convective lifting column, attached beneath said water vapor condensation means, promoting convective air movement inside said apparatus, while thermally isolating the ascending air therewithin from the outside ambient air, said lifting column further comprises, a plurality of column segments that are attached to each other in an airtight manner, an air intake area on a lower portion of the convective lifting column allowing air to enter therein also water transportation means and water distribution means, for conveying and dispensing water from said water vapor condensation means to a ground surface beneath the apparatus, said water transportation means further comprises, a spiral piping system hydraulically connected to the water vapor condensation means, said piping system positioned inside the convective lifting column, for transporting condensed water downward therethrough, said water distribution means further comprises a circular piping system, suspended below said intake area of the convective lifting column, hydraulically connected to said water transportation means for dispersing condensed water to the earth's surface below, and d) an altitude control means for controlling the position of the apparatus in the atmosphere.

* * * * *